(12) United States Patent
Glassman et al.

(10) Patent No.: US 7,257,554 B1
(45) Date of Patent: Aug. 14, 2007

(54) ANONYMOUS PURCHASES WHILE ALLOWING VERIFIABLE IDENTITIES FOR REFUNDS RETURNED ALONG THE PATHS TAKEN TO MAKE THE PURCHASES

(75) Inventors: Steven C. Glassman, Mountain View, CA (US); Mark S. Manasse, San Francisco, CA (US); John W. Court, Carrara (AU); Edmund J. Grohn, Mudgeeraba (AU); Andrew M. Palka, Mortimer (GB); Nigel Norris, Basingstoke (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/273,102

(22) Filed: Mar. 19, 1999

(51) Int. Cl.
*G06F 17/60* (2006.01)
(52) U.S. Cl. .................... 705/35; 705/27; 705/17; 705/21; 235/379
(58) Field of Classification Search ............... 705/35, 705/27, 44, 17, 21; 235/379
See application file for complete search history.

(56) References Cited

U.S. PATENT DOCUMENTS

| | | | |
|---|---|---|---|
| 4,924,378 A | 5/1990 | Hershey et al. ........... 364/200 |
| 5,148,479 A | 9/1992 | Bird et al. ................ 380/23 |
| 5,339,361 A * | 8/1994 | Schwalm et al. ......... 380/23 |
| 5,373,558 A * | 12/1994 | Chaum .................... 380/23 |
| 5,390,297 A | 2/1995 | Barber et al. ............ 395/200 |
| 5,440,634 A * | 8/1995 | Jones et al. .............. 380/24 |
| 5,553,143 A | 9/1996 | Ross et al. ............... 380/25 |
| 5,623,547 A * | 4/1997 | Jones et al. .............. 380/24 |
| 5,671,412 A | 9/1997 | Christiano ............... 395/615 |
| 5,745,879 A | 4/1998 | Wyman .................... 705/1 |
| 5,778,065 A | 7/1998 | Hauser et al. ............ 380/21 |

(Continued)

FOREIGN PATENT DOCUMENTS

EP          08 848 343 A2 *  6/1998

(Continued)

*Primary Examiner*—Vincent Millin
*Assistant Examiner*—Daniel Felten

(57) ABSTRACT

An electronic commerce system and method has a number of computer systems connected by a network, including a broker computer system having a database of scrips representing a form of currency, a vendor computer system having a database containing products which may be exchanged for the scrips, and a consumer computer system with which a user may initiate transactions to obtain the products contained in the database of the vendor computer system in return for scrip. The broker issues scrip to the consumer having a Customer ID including a Hash subfield containing a value produced by consumer identifying information hashed with a nonce. When the scrip is exchanged for additional scrip, the value in the Hash subfield is hashed with another nonce. The consumer stores the nonces used to produce the Hash subfield in a wallet. If a vendor issuing a refund for scrip wishes to verify the identity of the consumer, the consumer provides the vendor with the identifying information and the chain of nonces used to produce the value of the Hash subfield. The vendor recreates the value of the Hash Subfield to verify the identifying information. Then, the vendor issues a refund coupon having the same Customer ID as the scrip being refunded. The consumer provides the refund coupon to the broker along with the Customer ID of the scrip used to purchase the refunded scrip. Then, the broker issues the consumer new scrip having the provided customer ID.

15 Claims, 8 Drawing Sheets

U.S. PATENT DOCUMENTS

| | | | |
|---|---|---|---|
| 5,802,497 A | 9/1998 | Manasse | 705/27 |
| 5,903,650 A | 5/1999 | Ross et al. | 380/25 |
| 5,913,203 A | 6/1999 | Wong et al. | 705/39 |
| 5,917,168 A * | 6/1999 | Nakamura et al. | 235/379 |
| 5,930,777 A * | 7/1999 | Barber | 705/40 |
| 5,935,246 A | 8/1999 | Benson | 713/200 |
| 5,987,438 A * | 11/1999 | Nakano et al. | 705/41 |
| 6,029,150 A * | 2/2000 | Kravitz | 705/39 |
| 6,039,250 A * | 3/2000 | Ito et al. | 235/380 |
| 6,047,242 A | 4/2000 | Benson | 702/35 |
| 6,055,529 A | 4/2000 | Furlani | 707/3 |
| 6,056,786 A | 5/2000 | Rivera et al. | 795/712 |
| 6,058,381 A | 5/2000 | Nelson | 705/40 |
| 6,073,124 A | 6/2000 | Krishnan et al. | 705/59 |
| 6,105,864 A * | 8/2000 | Shiobara et al. | 235/379 |
| 6,157,917 A | 12/2000 | Barber | 705/26 |
| 6,189,146 B1 | 2/2001 | Misra et al. | 717/11 |
| 6,236,981 B1 | 5/2001 | Hill | 705/67 |
| 6,293,867 B1 | 9/2001 | Heidel et al. | 463/25 |
| 2001/0011253 A1 | 8/2001 | Coley et al. | 705/59 |

FOREIGN PATENT DOCUMENTS

| | | | |
|---|---|---|---|
| EP | 848343 A2 | 6/1998 | |
| EP | 895149 A1 | 2/1999 | |
| GB | 2316503 A | 2/1998 | |
| JP | 10-171887 | * 12/1996 | |
| JP | 10-171887 | 6/1998 | |
| WO | WO91/16691 | * 10/1991 | |
| WO | WO98/58306 | 12/1998 | |

* cited by examiner

Figures 4, 5:
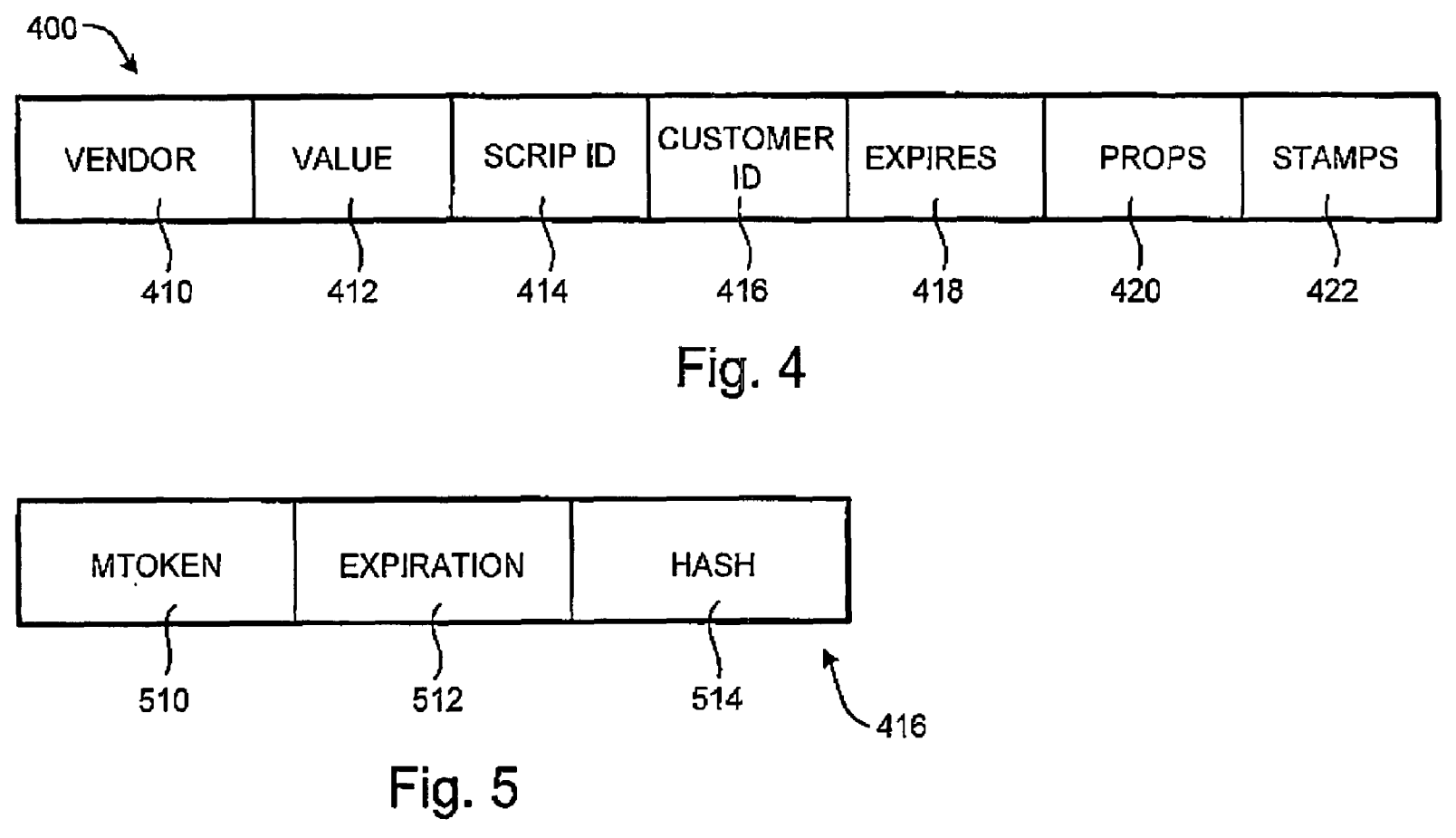

| VENDOR | VALUE | SCRIP ID | CUSTOMER ID | EXPIRES | PROPS | STAMPS |
|---|---|---|---|---|---|---|
| 410 | 412 | 414 | 416 | 418 | 420 | 422 |

| MTOKEN | EXPIRATION | HASH |
|---|---|---|
| 510 | 512 | 514 |

ANONYMOUS PURCHASES WHILE ALLOWING VERIFIABLE IDENTITIES FOR REFUNDS RETURNED ALONG THE PATHS TAKEN TO MAKE THE PURCHASES

CROSS-REFERENCE TO RELATED APPLICATIONS

This application is related to U.S. Pat. No. 5,802,497, entitled METHOD AND APPARATUS FOR CONDUCTING COMPUTERIZED COMMERCE, which issued on Sep. 1, 1998 and is hereby incorporated by reference herein.

This application is also related to U.S. patent application Ser. No. 09/081,521, entitled METHOD FOR COMMUNICATING SECURE AND AUTHENTICATED TRANSACTIONS OVER AN NON-SECURE NETWORK SUBJECT TO EXPORT RESTRICTIONS, which was filed on May 19, 1998, and is hereby incorporated by reference herein.

This application is also related to U.S. patent application Ser. No. 09/273,240, entitled ENCRYPTING SECRETS IN A FILE FOR AN ELECTRONIC MICRO-COMMERCE SYSTEM, which was filed on the same date as the instant application.

BACKGROUND

Field of the Invention

This invention relates generally to an electronic commerce system and more particularly to providing refunds while maintaining relative anonymity in the system.

BACKGROUND OF THE INVENTION

With the advent of electronic forms of communication, including telegraph, telephone, radio, television, and more recently digital networks, it has become possible to conduct commerce electronically using digital computer systems. Electronically encoded funds are different than physical currency in that it is a trivial matter to duplicate electronic representations of finds. One of the difficult tasks faced in conducting computerized commerce is to detect the illegal re-use of electronic funds, e.g., double spending.

Known electronic fund transfer systems generally require a "trusted" third party between the vendor and consumer to authenticate the validity of the electronic finds. The requirement of a third party adds expense to every transaction because of the cost of extra communications and encryption. In addition, current electronic fund transfer networks, e.g., Western Union and Federal Reserve banks, typically require physically secure communications media which are immune to "eavesdropping." Such secure networks are generally not available to consumers at large.

Alternative methods of electronic fund transactions involve establishing a long-term relationship between the vendor and consumer, either though a subscription service or by billing accounts as are provided by credit card organizations. These methods are efficient at handling transaction requests, assuming a reasonable authentication scheme. However, these methods require a prior effort to establish an "account" or other evidence of credit worthiness. For a large number of consumers, e.g. all potential users of a large network of computers-like the Internet, setting up accounts and maintaining credit information adds prohibitive expense to the vendors, and inconvenience and impediments to the consumers.

The recent growth of public access communications networks, such as the Internet, has accelerated the need for a low-cost computerized electronic commerce system. In addition, in the information marketplace there is a particular need to economically support transactions that are for amounts as small as a hundredth of a cent.

U.S. Pat. No. 5,802,497 (the '497 patent) describes a lightweight and secure protocol for electronic commerce over the Internet. The protocol is designed to support purchases costing less than a cent. The system is based on decentralized validation of electronic cash at a vendor's server without any additional communication, expensive encryption, or off-line processing.

Two innovations in the '497 patent are its use of brokers and scrip. Brokers take care of account management, billing, connection maintenance, and establishing accounts with vendors. Scrip is digital cash that is valid for only a specific vendor. The vendor locally validates the scrip to prevent customer fraud, such as double spending.

Every time a user visits a new vendor, the user must get scrip for that vendor from a broker. Scrip is held and manipulated by the user using an application called a "wallet." The wallet includes scrip with each request to purchase content and gets back change from the vendor with the returned content.

Occasionally, the consumer may want to get a refund for scrip. Perhaps the consumer did not like the received content, or the transaction failed, or the consumer merely wants to convert the vendor scrip back into broker scrip. The '497 patent does not describe a mechanism for such refunds.

Refunds can be divided into two classes: safe and potentially fraudulent. A safe refund is a conversion of unspent vendor scrip back into broker scrip. There is no question of fraud and if there is any cost for the refund, it is deducted as a fee from the refund. In this case, the vendor should perform the refund without requiring any additional information about the consumer's identity.

A potentially fraudulent refund occurs when a consumer asks for a refund for spent scrip resulting from a failed transaction or unacceptable product. While there is no reason for a vendor to need the identity of the consumer for a regular transaction or a safe refund, a vendor may want to identify consumers seeking potentially fraudulent refunds. Only by tracking all refund requests and noticing patterns of abuse by specific consumers can vendors detect and prevent fraud.

Thus, a refund mechanism should balance the consumers' desire for anonymity while making purchases with the vendor's desire to identify consumers who ask for potentially fraudulent refunds. The refund mechanism should also allow the vendor to validate the identity information from the consumers without needing additional storage or communication with the broker.

Moreover, a vendor might have multiple brokers issuing its scrip. If the consumer gets a refund for a specific piece of scrip, the refund should be issued for the broker that either directly sold the scrip, or sold the scrip from which the scrip was derived.

Furthermore, the refunded broker scrip and any scrip derived from it should be as secure as scrip purchased directly from the broker. The vendor should not be able to spend the refunded broker scrip or any scrip subsequently derived from it.

SUMMARY OF THE INVENTION

The above needs are met by a method and system for electronic commerce that provides relative anonymity for regular purchases but optionally allows the vendor to quickly and easily verify the identity of a consumer seeking a refund. The system includes a broker computer system having a database of vendor scrips, each vendor scrip representing a form of electronic currency. The system also includes a vendor computer system having a database containing products which may be exchanged for the vendor scrips, the vendor computer system capable of providing vendor scrips. In addition, the system includes a consumer computer system having a user interface whereby a consumer may initiate transactions in the consumer computer system to obtain one or more of the products contained in the database of the vendor computer system.

Each piece of scrip has a value, which may range from a few dollars to a few hundredths of a cent. In addition, each piece of scrip has a Customer ID from which a customer secret (CS) is derived. The broker and the vendor share and maintain a master customer secrets (MCS) table indexed by bits of the Customer ID. When a broker (or vendor) issues scrip to the consumer, the broker hashes the Customer ID with the MCS specified in the table to form the CS. A preferred embodiment of the present invention uses the HMAC-MD5 algorithm for hashing. The CS is sent to the consumer with the associated piece of scrip. The consumer holds the scrip and its associated CS in a database called a "wallet" and uses the CS to prove that the consumer has the right to spend the associated scrip.

In addition, the Customer ID field of a scrip has a Hash subfield. When the consumer makes the initial scrip purchase from a broker, the consumer and/or the wallet provide the broker with unique identifying information. The broker hashes this identifying information with a first nonce—a unique string of arbitrary length generated by the broker—and stores the resulting hash in the Hash subfield. The broker provides the first nonce to the consumer and the consumer stores the nonce in the wallet.

When scrip is used to buy scrip with a different Customer ID (for instance, when the consumer exchanges broker scrip for vendor scrip), the value of the Hash subfield of the original scrip is hashed with another nonce to form the Hash subfield for the new scrip. For example, assume a consumer buys broker 2 scrip from a first broker, and then uses the broker 2 scrip to buy vendor scrip from a second broker. The Hash subfield of the broker 1 scrip is the hash of the identifying information with a first nonce. The Hash subfield of the broker 2 scrip is the Hash subfield of the broker 1 scrip hashed with a second nonce. The Hash subfield of the vendor scrip, in turn, is the hash of the Hash subfield of the broker 2 scrip with a third nonce. The consumer stores all three nonces (for the broker 1 scrip, the broker 2 scrip, and the vendor scrip) in the wallet.

Assume that the consumer wants to get a refund for the vendor scrip from the vendor and that the vendor desires to authenticate the identity of the consumer. In this case, the consumer provides the vendor with the vendor scrip, the unique identifying information, and the chain of nonces used to form the Hash subfield of the scrip. The vendor hashes the nonces with the identifying information and attempts to recreate the value stored in the Hash subfield of the scrip for which the consumer seeks the refund. If the recreated value matches the Hash subfield, then the consumer has provided the vendor with the correct identifying information.

If the vendor does not need to authenticate the identity of the consumer, the consumer does not provide the nonce and identity information. The vendor automatically approves the refund without verifying and logging the consumer's identity.

In response, the vendor preferably issues the consumer a refund coupon having the same Customer ID as the scrip being refunded. Preferably, the refund coupon is issued from a special scrip series for the broker who issued the vendor scrip. Then, the consumer provides the refund coupon to the broker, along with the Customer ID of the broker scrip used to purchase the vendor's scrip. In response, the broker issues the consumer new broker scrip having the provided customer ID. The consumer can use this new broker scrip to seek a cash refund or buy new vendor scrip.

BRIEF DESCRIPTION OF THE DRAWINGS

FIG. 4 is a block diagram illustrating the data fields of a piece of scrip used in the system of FIG. 1;

FIG. 5 is a block diagram illustrating a more detailed view of the Customer ID field of the scrip of FIG. 4;

DETAILED DESCRIPTION OF THE PREFERRED EMBODIMENTS

Figure 1:
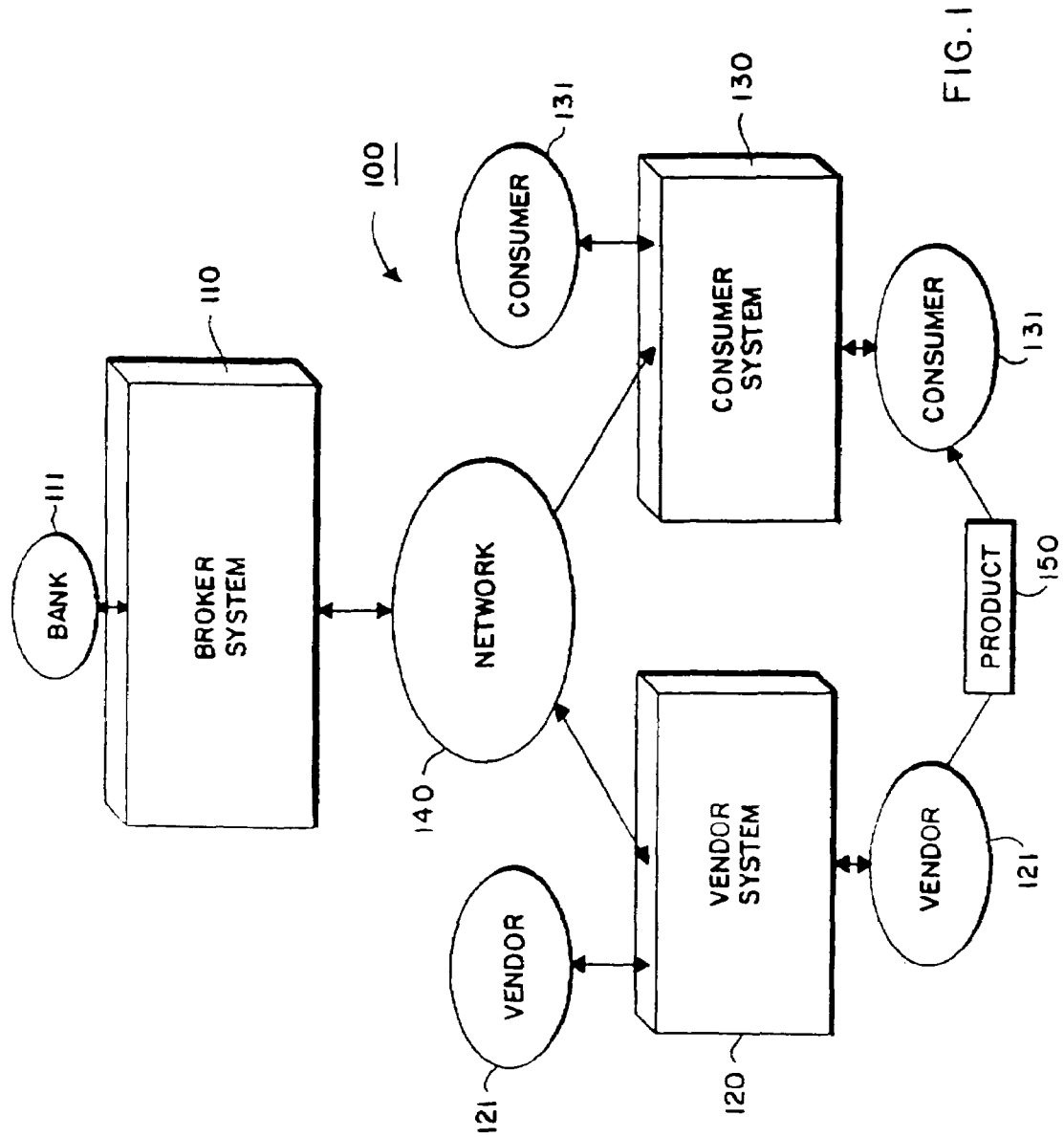
FIG. 1 is a top-level block diagram illustrating a computerized system for conducting electronic commerce.

FIG. 1 shows a computerized system 100 for conducting electronic commerce according to the principles of the invention. The system 100 includes a broker system 1110, a vendor system 120, and a consumer system 130 interconnected by a communications network 140.

For clarity, the system 100 depicted in FIG. 1 shows only single broker, vendor, and consumer systems. In actual practice, any number of broker, vendor, and consumer systems can be interconnected by the network 140.

The broker 111 using the broker system 110 can be a bank, a credit provider, an Internet service provider, a telephone company, or any institution the consumer trusts to sell scrip. The vendor system 120 is operated by a vendor 121. The vendor 121 provides products 150 of any type to consumers.

A consumer 131 can use the consumer computer system 130 to "electronically" acquire the products 150 of the vendor 121. The network 140 can be public or private, such as, for example, the Internet, a switched telephone system, a satellite linked network, or another form of network.

Figure 2:
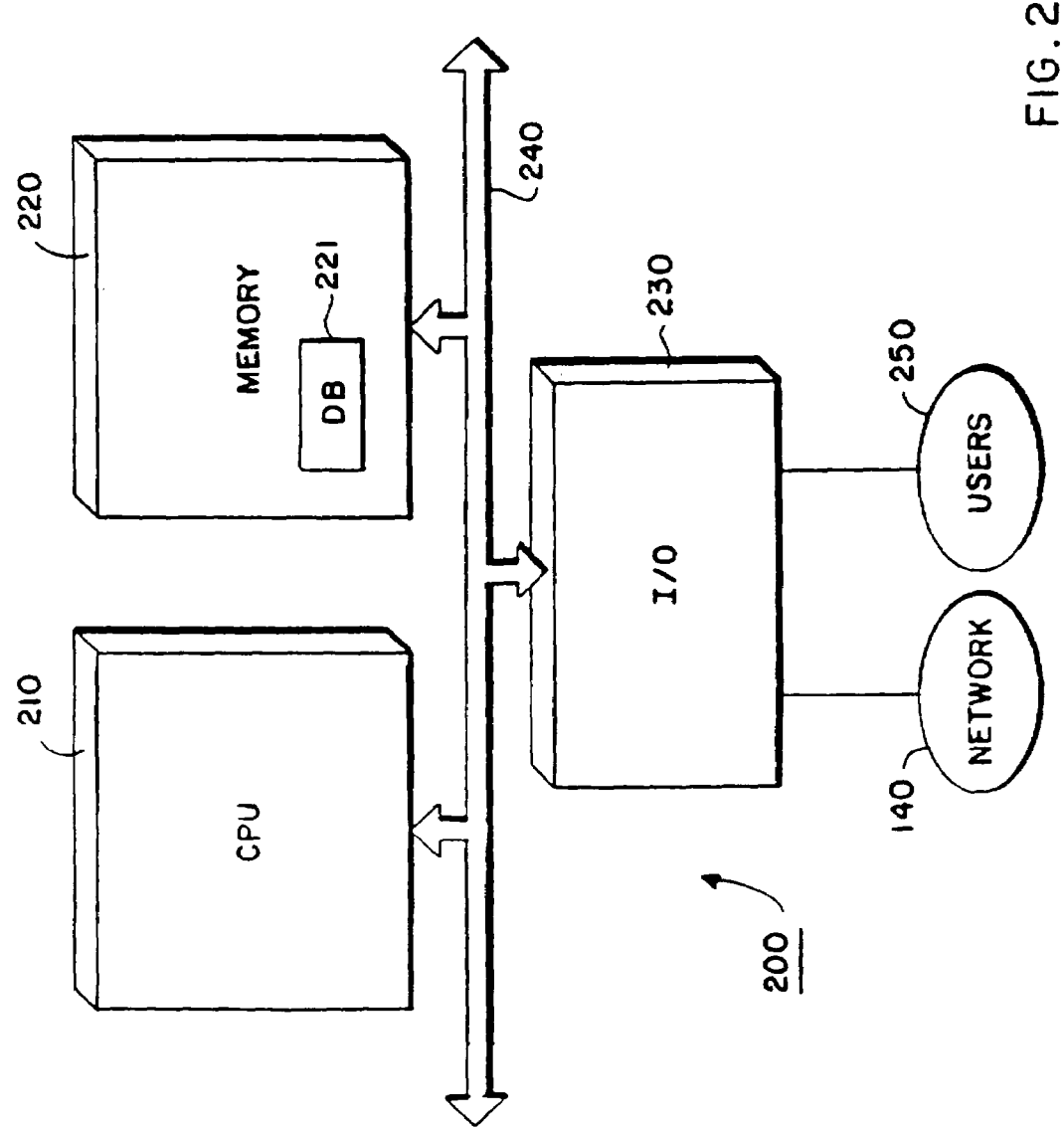
FIG. 2 is a block diagram illustrating a computer system used in the system of FIG. 1.

A computer system 200 suitable for use as the broker, vendor, and consumer systems is shown in FIG. 2. The computer system 200 includes a central processing unit (CPU) 210, a memory 220, and an input/output interface 230 connected to each other by a communications bus 240. The CPU 210, at the direction of users 250, e.g. brokers, vendors, and/or consumers, executes software programs for manipulating data. The programs and data can be stored in the memory 220 as a database (DB) 221. The DB 221 storing programs and data on the consumer computer system 130 is referred to as a "wallet."

The memory 220 can include volatile semiconductor memory as well as persistent storage media, such as disks. The I/O interface 230 is for communicating data with the network 140, the users 250, and other computer system peripheral equipment, such as printers, tapes, etc.

The computer system 200 is scaled in size to function as the broker, vendor, or consumer systems. For example, when scaled as the consumer computer system 130, the computer system 200 can be a small personal computer (PC), fixed or portable. The configurations of the computer system 200 suitable for use by the broker 111 and the vendor 121 may include multiple processors and large database equipped with "fail-safe" features. The fail-safe features ensure that the database 221 is securely maintained for long periods of time.

Figure 3:
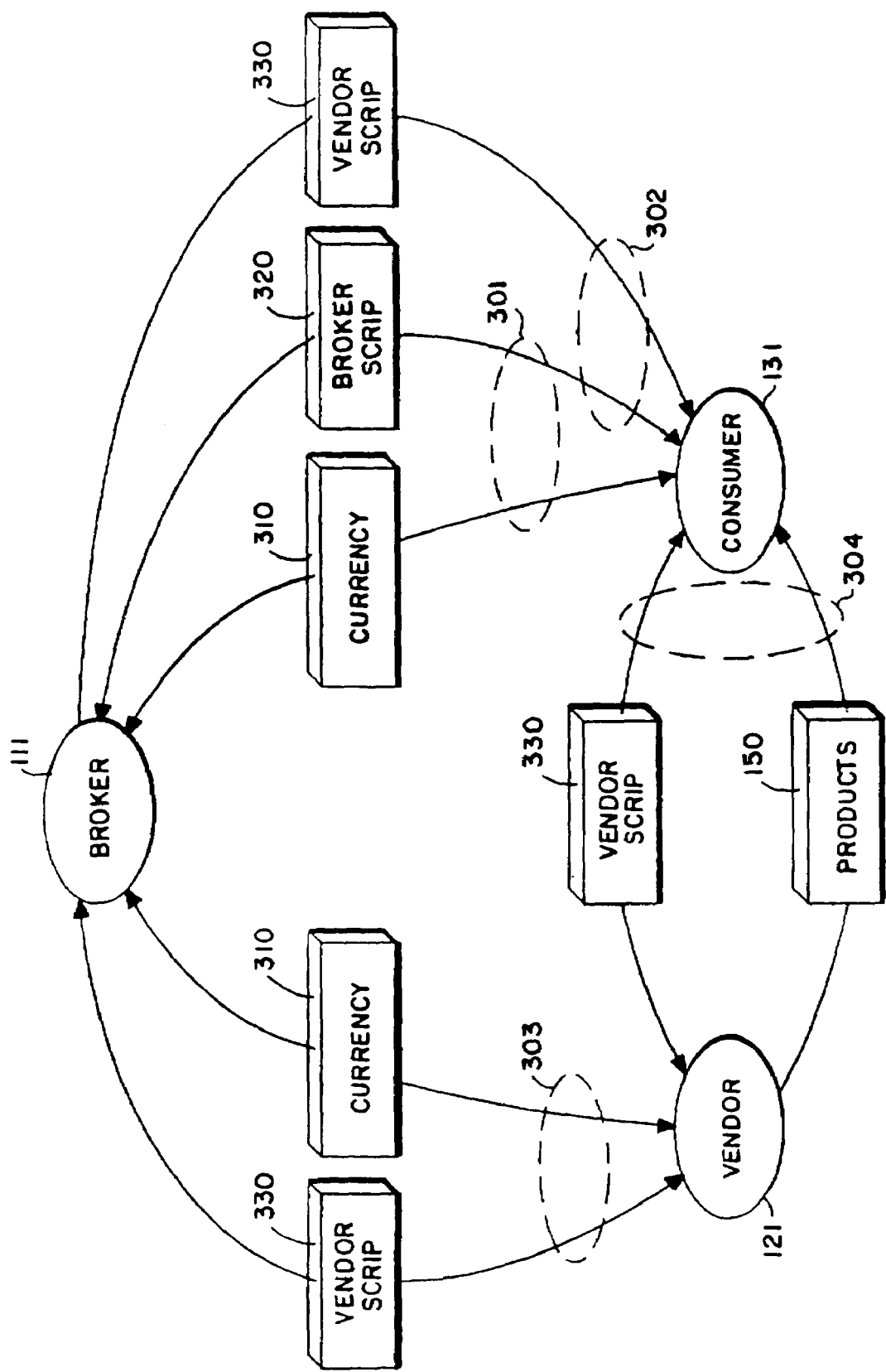
FIG. 3 is a flow diagram illustrating the operations of the system of FIG. 1.
Figure 3A:
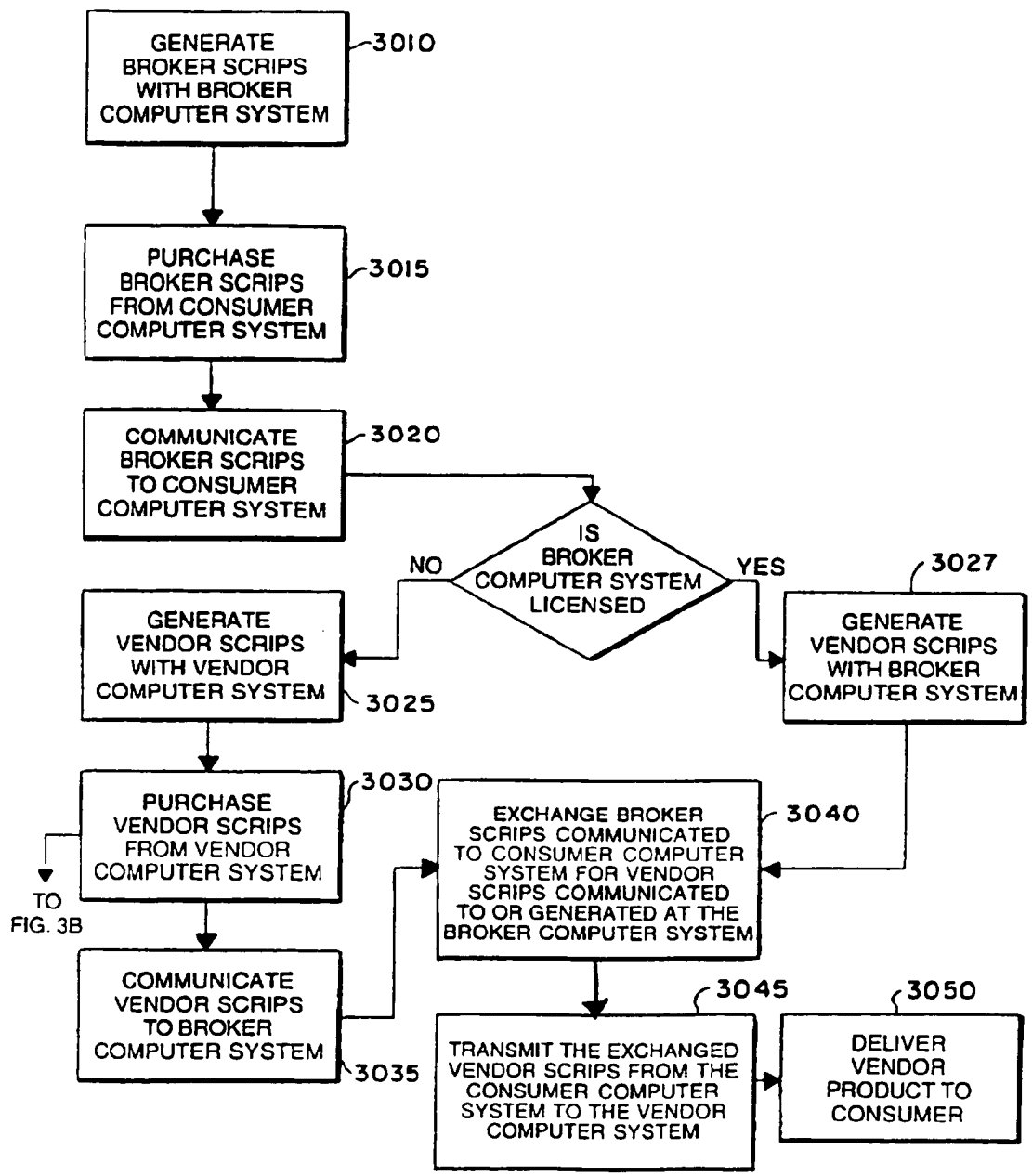
FIG. 3A is a flow chart illustrating certain operations depicted in FIG. 3.

FIG. 3 and FIG. 3A show an operation of the system 100 according to a preferred embodiment of the invention. The consumer 131 in step 3015 uses currency to purchase electronic broker scrip 320 generated in step 3010 by the broker 111. Here, purchasing means that upon a validation of the authenticity of the consumer 131 and the consumer's currency 310, the broker system 110 generates signals, in the form of data records. The signals in step 3020 are communicated, via the network 140, to the consumer system 130 for storage in the wallet 221 of the memory 220 of the consumer system 130.

The currency 310 which is exchanged for scrip 320 can be cash, check, credit card, bank ATM card, debit card, phone card, or other items of value. The scrip 320 can also be freely exchanged with "coupons" frequently used in promotional schemes. The "coupons" can be in form of the scrip.

The scrip is described in further detail below. In brief, the scrip is stamped by the generator of the scrip. This means that the scrip carries information that is verifiable by only the originator. In addition, each scrip is uniquely identifiable. After a single use, the originator of the scrip can "invalidate it," meaning that the signals of the data record are no longer accepted for processing by the originating computer system.

Preferably, the broker system 110 in step 3027 executes licensed software programs which generate vendor scrip 330 for the consumer 131 as needed. In this case, the "value" of the license can be proportional to the amount of scrip that the licensee can generate. Alternatively, the broker 111, in a similar transaction 303, exchanges currency 310 for bulk electronic vendor scrip 330 in step 3030 and 3035. The vendor scrip 330 is generated in step 3025 by the vendor system 120. As will be described below, the scrip can have an expiration date so that the issuer does not forever need to maintain data regarding the issued scrip.

The consumer 131 desiring the products 150 provided by the vendor 121, can exchange 3040, 3045, 302 the broker scrip 320 for vendor scrip 330, and then exchange the vendor scrip for products 150. If the purchase price of the product 150 is less than the value of the vendor scrip 330, new vendor scrip can be issued for the balance as "change." As described in more detail below, a separate transaction type allows consumers 131 to ask vendors 121 and brokers 111 to refund scrip.

Figure 3B:
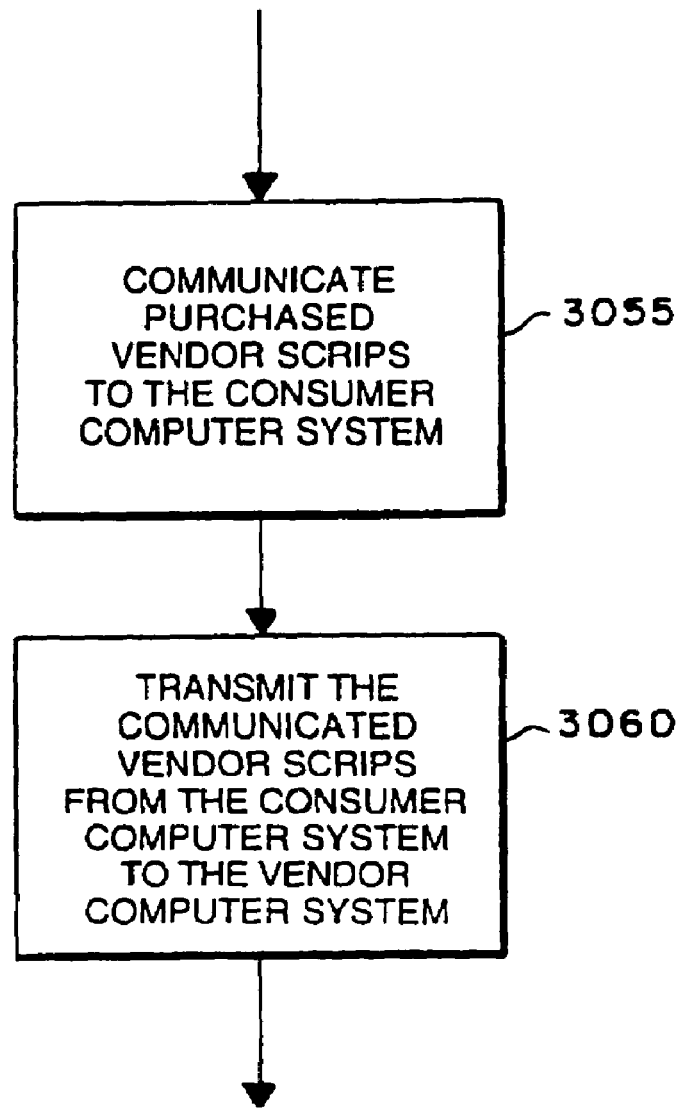
FIG. 3B is a flow chart illustrating other operations depicted in FIG. 3.

In an alternative embodiment shown in FIG. 3, FIG. 3A and FIG. 3B, the consumer 131 can establish an "account" with the vendor 121 to acquire vendor scrip 330 directly, without the need of a third party broker as indicated in steps 3055 and 3060. Establishing an account means that an account data record is maintained in the vendor computer system 120.

The consumer 131, in a transaction 304, submits in step 3045, the vendor scrip 330 to the vendor 121. The vendor 121 checks the stamp of the vendor scrip 330 to verify its authenticity, and to validate the "currency" amount. Verification also checks the local database to determine whether the scrip is previously spent. Approval of the transaction 303 results in the delivery of the desired product 150 to the consumer 131 in step 3050. In the transaction 304, change can also be returned to the consumer 131 in the form of vendor scrip having a value which is the amount of the over-payment, e.g., another data record communicated by the network 140.

The broker selling the initial scrip to the consumer normally knows the identity of the consumer. In addition, when a consumer buys scrip from a either a primary or secondary broker, the broker knows for which of its vendors or other brokers the consumer purchases scrip. Furthermore, each vendor knows the specific items the consumer is purchasing from the vendor. However, without either completely observing the consumer's requests, or merging records, no single entity knows the full purchase history of the consumer.

Thus, the vendor 121 does not know—and cannot normally determine—the identity of the consumer 131. The vendor 121 needs to ensure only that valid vendor scrip 330 is being exchanged for products 150. In other words, the databases of the broker, vendor, and consumer are separately and securely maintained, using methods and systems for protecting networks, computer systems, and databases that are known in the art.

The electronic signals which represent the scrip, and which are processed and communicated by the system 100 are described with reference to FIG. 4. FIG. 4 is a block diagram illustrating the data fields of a single piece of scrip 400 according to one embodiment of the present invention. The scrip 400 is logically separated into seven data fields. The Vendor field 410 identifies the vendor for the scrip 400. The Value field 412 gives the value of the scrip 400. The script ID field 414 is the unique identifier of the scrip. The Customer ID field 416 is used by the broker 111 and vendor 121 to determine the customer secret (CS) for the scrip and holds additional information supporting refund processing as described below. A portion of the Customer ID field 416 forms the Customer ID partition number. The Expires field 418 gives the expiration time for the scrip 400. The Props field 420 holds customer properties, such as the customer age, state of residence, etc. Finally, the Stamp field 422 holds a digital signature and is used to detect tampering of the scrip 400.

In a preferred embodiment of the present invention, the broker 111 and vendor 121 share a Master Customer Secret (MCS) table indexed by the partition number of the Customer ID field 416. Thus, the MCS table is as follows:

MCS Table:

| Partition Number | Master Customer Secrets |
|---|---|
| $P_1$ | $MCS_1$ |
| $P_2$ | $MCS_2$ |
| $P_3$ | $MCS_3$ |

Both the partition numbers and the MCS are preferably binary strings having lengths and values agreed to by the broker 111 and the vendor 121.

When the consumer 131 buys scrip 400 from the broker 111 (or receives scrip from a vendor 121), the broker 111 generates the CS for the scrip 400 by determining the partition number from the Customer ID field 416 and looking up the corresponding MCS in the MCS table. Then, the broker 111 calculates the CS from a hash of the customer ID with the MCS:

$$CS = H(\text{customer ID, MCS}),$$

where H( ) denotes a hash function. In one embodiment, the hash function used throughout the electronic commerce system is HMAC-MD5, described in H. Krawczyk, M. Bellare, R. Canetti, "HMAC: Keyed-Hashing for Message Authentication," RFC 2104, February 1997, and R. Rivest, "The MD5 Message Digest Algorithm," RFC 1321, April 1992, both of which are hereby incorporated by reference herein. However, any suitably secure one-way hash function can be substituted.

If this is the first piece of scrip purchased by the consumer 131 from the broker 111, the CS is provided to the consumer 131 via a secure channel and the consumer 131 stores the CS in the wallet 221. A preferred secure channel is described in U.S. patent application Ser. No. 09/081,521, entitled METHOD FOR COMMUNICATING SECURE AND AUTHENTICATED TRANSACTIONS OVER AN NON-SECURE NETWORK SUBJECT TO EXPORT RESTRICTIONS, which was filed on May 19, 1998, and is hereby incorporated by reference herein.

If the consumer 131 has already received a CS from the broker 111, the broker 111 uses the previously provided CS (the old CS, or OCS) to transmit a new CS (NCS) to the consumer 131 without requiring a secure channel. The broker 111 calculates the NCS using the Customer ID field 416 and the corresponding MCS in the MCS table in the same manner that the OCS was calculated. Then, the broker 111 calculates a result as follows:

$$\text{result} = NCS \ XOR \ H(\text{nonce, OCS}),$$

where "XOR" is the exclusive-or function and a nonce is a random, guaranteed unique string of arbitrary length. The result and the nonce are passed to the consumer 131.

When the consumer 131 receives the result and nonce, the consumer 131 derives the NCS by performing the calculation:

$$NCS = \text{result} \ XOR \ H(\text{nonce, OCS}).$$

The consumer 131 preferably stores the NCS with the corresponding scrip 400 in the wallet 221. Thus, the broker 111 communicates the value of the NCS to the consumer 131 without actually transmitting the NCS in the clear. The consumer 131 uses the CS to prove ownership of, i.e., possession of the right to spend, the scrip.

In a preferred embodiment of the present invention, the consumer 131 requests product from the vendor 121 in the context of the World Wide Web (WWW). However, the present invention can be used for purchases in any electronic context. Accordingly, the request is phrased as a uniform resource locator (URL) pointing to a location at a vendor-controlled domain.

To spend scrip 400 for a product, the consumer 131 sends the vendor 121 a message in the form:

$$\text{scrip, request, } H(\text{scrip, request, CS}),$$

where scrip is the vendor scrip 400 issued to the consumer, the request is the URL specifying the requested product, and H(scrip, request, CS) is a hash of the scrip, request, and the CS. Thus, the consumer 131 sends the scrip in the clear (unencrypted).

When the vendor 121 receives the scrip 400, the vendor 121 first validates the Stamp field 422 to ensure that the scrip 400 was not altered. Next, the vendor 121 validates that the consumer 131 possesses the correct CS. This validation is performed by extracting the partition number from the Customer ID field 416 of the received scrip and looking up the corresponding MCS in the MCS table held in the database 221. Then, the vendor recreates the CS by calculating CS=H(Customer ID, MCS). Using the recreated CS, the vendor 121 calculates the request stamp H(scrip, request, CS). If the calculated request stamp matches the request stamp supplied by the consumer 131, then the vendor 121 has a high degree of confidence that the scrip 400 was received from someone knowing the CS.

Once the vendor 121 has validated the scrip 400 and consumer 131, the vendor preferably provides the requested product to the consumer 131. Also, the vendor 121 may issue scrip to the consumer 131 as change by using the techniques described above.

For normal purchases, as described above, the knowledge of secrets follows a defined trust relationship. It is acceptable for brokers 111 to know the customer secrets for vendor 121 scrip because the brokers 111 are trustworthy. Vendors 121 know the customer secrets for scrip they validate or produce. Also, consumers 131 know the customer secrets for only the scrip they own.

When a vendor 121 issues a refund, it reverses the normal broker-vendor-consumer flow of trust. A vendor 121 produces refund scrip in the name of the broker 111, even though vendors 121 are not assumed to be totally trustworthy. Furthermore, if the vendor produces the refund as regular broker scrip, then the vendor 121 knows the CS for the resulting broker scrip. If that broker scrip were used to buy vendor scrip for another vendor 121, the refunding vendor 121 could know the customer secret for the new scrip if the vendor could eavesdrop on the consumer's transactions at the broker 111. However, as indicated by the trust relationship, it is unsafe for vendors to know the CS of other vendors' scrip.

Accordingly, the present invention provides refunds without violating the trust relationship defined above. FIG. 5 illustrates a more detailed view of the Customer ID field 416 of FIG. 4 according to a preferred embodiment of the present invention. The Customer ID field 416 has three subfields: Mtoken 510, Expiration 512, and Hash 514. There is also a nonce associated with the Customer ID field 416 which is communicated along with the scrip, but, for privacy reasons, is not directly included in the scrip. The Mtoken subfield 510 holds the Customer ID partition number described above with which a broker 111 and a vendor 121 (or two brokers) use to index to the shared MSC table. In addition, the Mtoken subfield 510 may hold additional information identifying the CS, such as a serial number.

The Expiration subfield 512 indicates the latest date on which any scrip generated with this customer ID can be used to obtain a refund. The expiration date is preferably chosen from a restricted set, such as a month or day boundary. If the expiration date was too specific, it could act as a de-facto ID for that consumer and could inadvertently tie together otherwise unrelated purchases by the consumer 131. In addition, since the Expiration subfield 512 is the expiration date for refunding the scrip, and the Expires field 418 is the expiration date for spending the scrip, it is likely that the two dates will be different.

The Hash subfield 514 holds a value derived from the hash of a value, I, uniquely identifying the consumer 131 or wallet 221 and a nonce. Thus, the Hash subfield 514 of the first piece of broker scrip holds the value:

$$hash_1 = H(nonce_1, I).$$

Only the first broker is given the identity value, I. After that, other brokers and vendors are given hash values derived from I. When the first broker generates scrip for a vendor or a second broker, the first broker 111 chooses a new nonce, $nonce_2$, and generates the hash:

$$hash_2 = H(hash_1, nonce_2).$$

More generally, the Hash subfield 514 holds the value:

$$h_i = H(h_{i-1}, n_i),$$

where $h_1$ is the identifying value I, $h_{i+1}$ is a hash, and $n_i$ is a nonce.

In one embodiment, the unique identifying value I is supplied by the consumer 131 and/or the wallet 221. In another embodiment, the consumer 131 provides some information and the wallet 221 appends additional information. For example, the unique value I may be an email address, a pass phrase, a name, or a broker-assigned ID number supplied by the consumer 131, and a short text string supplied by the wallet. In an alternative embodiment, the wallet supplies the entire identifying value. This alternative may be preferred because it does not require the consumer 131 to memorize and recall information.

In a preferred embodiment of the present invention, the unique value I includes a predetermined string and is not merely a random string. For example, in one embodiment the wallet-supplied value is a random number appended to the string "WID". If the unique value were merely a random string, a malicious consumer or malicious wallet could make the unique number a string that is an intermediate result of a sequence of hashes. As is described below, the malicious wallet could obscure its identity by presenting vendors or brokers with different hashes in the sequence. Since it is difficult to derive an intermediate hash result having a particular value, including the predetermined string helps to defeat this type of attack.

Each time a broker 111 or vendor 121 uses a new nonce to create a hash in the Hash subfield 514, the broker 111 or vendor 121 supplies the nonce to the wallet 221. The wallet 221 stores the nonces apart from the scrip, but maintains the associations between the nonces and the scrip. Thus, the wallet 221 can provide the chain of nonces that were used to create a particular hash value.

Figure 6:
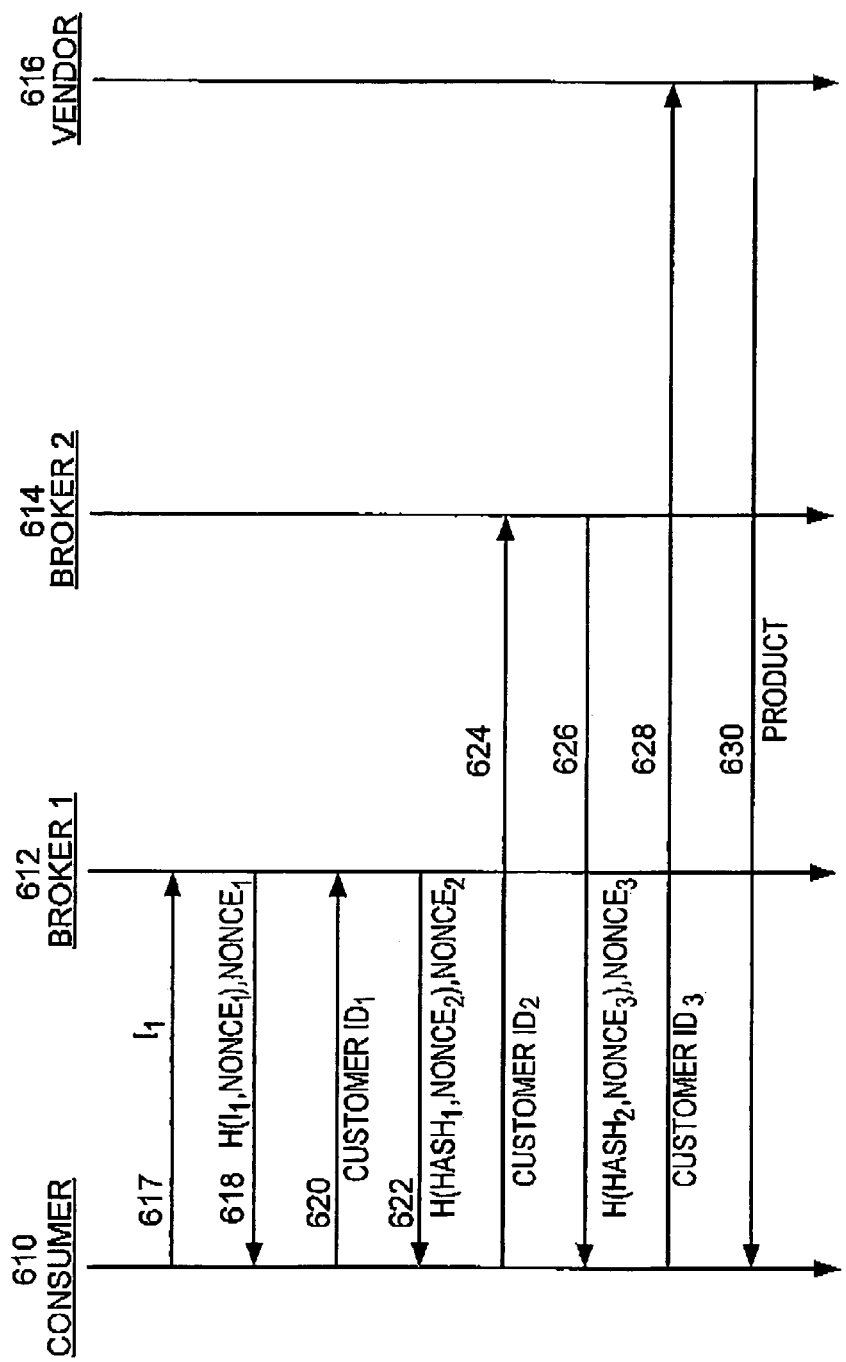
FIG. 6 is a flow diagram illustrating the interactions between a consumer, two brokers, and a vendor when the consumer purchases product from the vendor.

FIG. 6 is a flow diagram illustrating the interactions between a consumer 610, two brokers respectively called broker 1 612 and broker 2 614, and a vendor 616 when the consumer 610 purchases product from the vendor 616. In the illustrated example, broker 1 612 sells broker scrip for itself and for broker 2 614. Broker 2 614, in turn, sells vendor scrip for the vendor 616. Note that the interactions performed by the consumer 610 may be automatically performed by the wallet 221.

First, the consumer 610 purchases 617 broker 1 scrip from broker 1 612. The consumer may pay for this purchase with real money (e.g., cash or a credit card). The consumer also provides broker 1 612 with identifying information $I_1$, which uniquely identifies the consumer 610. In return, broker 1 hashes $I_1$ with a nonce, $nonce_1$, and stores the resulting hash value, $hash_1$, in the Hash subfield 514 of the broker 1 scrip, thereby forming customer $ID_1$. Broker 1 612 issues 618 the broker 1 scrip having customer $ID_1$ to the consumer 610 along with nonce.

The consumer 610 uses the broker 1 scrip to purchase 620 broker 2 scrip from broker 1 614. Broker 1 calculates $hash_2 = H(hash_1, nonce_2)$ and places the result in the Hash subfield 514 of the broker 2 scrip, thereby forming Customer $ID_2$. The broker 2 scrip and $nonce_2$ are sent 622 to the consumer 610 and stored in the wallet 221.

The consumer 610 uses the broker 2 scrip to purchase 624 vendor scrip from broker 2. Broker 2 calculates $hash_3 = H(hash_2, nonce_3)$ and places the result in the Hash subfield 514 of the vendor scrip, thereby forming Customer $ID_3$. The vendor scrip and $nonce_3$ are sent 626 to the consumer 610 and stored in the wallet 221.

Then, the consumer 610 uses the vendor scrip to purchase 628 product from the vendor 616. The vendor 616 provides 630 the product to the consumer 610, along with any change that the consumer 610 is due.

Figure 7:
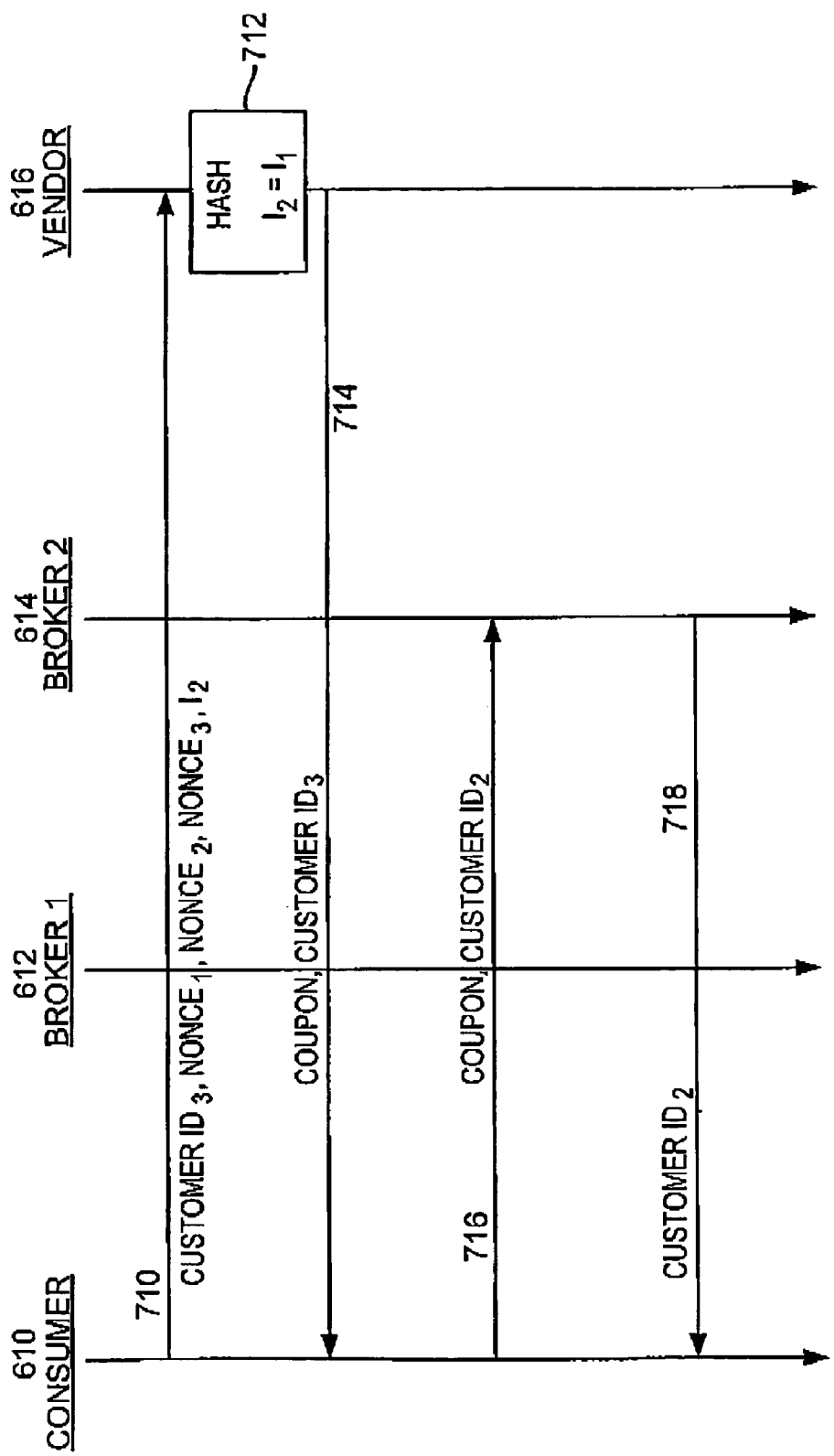
FIG. 7 is a flow diagram illustrating the interactions between the consumer, the two brokers, and the vendor when the consumer obtains a refund according to an embodiment of the present invention.

Suppose, however, that the consumer 610 never receives the product, or that the consumer is unhappy with the product, and wishes to obtain a refund for the spent scrip, or that the consumer merely wants to get a refund for unspent scrip. FIG. 7 is a flow diagram illustrating the interactions between the consumer 610, the two brokers 612, 614, and the vendor 616 when obtaining a refund according to an embodiment of the present invention.

The consumer 610 requests 710 a refund coupon from the vendor 616. In one embodiment, the consumer 610 makes this request by visiting a location at the vendor's 616 web site identified by a reserved uniform resource locator (URL) and providing the scrip for which the consumer seeks the refund (i.e., the vendor scrip spent to purchase the product or vendor scrip that the consumer does not want to spend). At this point, assume the vendor 616 wishes to verify the identity of the consumer 610 in order to detect fraud. Accordingly, the vendor 616 requests that the consumer and/or wallet provide identification information $I_2$ and the series of nonces that were used to create the value of the Hash subfield 514 of the scrip for which the consumer 610 seeks a refund. Then, the vendor uses the identifying information $I_2$ and the series of nonces to produce 712 a new hash value as follows:

$$a = H(I_2, nonce_1);$$

$$b = H(a, nonce_2); \text{ and}$$

$$c = H(b, nonce_3).$$

If c is equal to the value in the Hash subfield 514 of the vendor scrip, then identifying information $I_2$ equals the identifying information $I_1$ and the vendor 616 has verified the identity of the consumer 610 seeking the refund.

Accordingly, the vendor 616 issues 714 a refund coupon to the consumer 714. The coupon has customer $ID_3$, the same customer ID as the scrip being refunded. In one embodiment, the refund coupon is scrip issued from a special series at the vendor's broker 614 reserved for the vendor's refund coupons. Because broker 2 614 is the same broker that issued the initial vendor scrip to the user, broker 2 614 knows the shared MCS associated with customer $ID_3$.

The consumer 610 supplies 716 the refund coupon to broker 2 614 along with Customer $ID_2$, the customer ID of the broker scrip the consumer 610 used to buy the vendor scrip.

In turn, broker 2 returns 718 new broker 2 scrip having customer $ID_2$, the customer ID of the consumer's original broker 2 scrip. The wallet 221 remembers the CS associated with this scrip from when it first received scrip with customer $ID_2$. Broker 2, of course, already knows the MCS for the scrip having customer $ID_2$. Since every customer ID partition has a different MCS, the vendor 616 will not know the MCS for customer $ID_2$. Therefore, the vendor 616 cannot interfere with future transactions derived from the refunded scrip. Although not illustrated in FIG. 7, the consumer 610 can continue the refund back up the chain of brokers. The refunded broker 2 scrip can be refunded by broker 2 614 into a broker 1 refund coupon and the broker 1 refund coupon can be exchanged at broker 1 612 for broker 1 scrip with customer $ID_1$. Likewise, the consumer 610 can seek a cash refund for the broker 1 scrip from broker 1 612.

The vendor 616 does not always need to validate the consumer's identity to issue a refund. The consumer may not be asking for a refund to settle a problem with spent scrip, but merely be asking for a refund of unspent scrip. The refund mechanism is the same in this case, except that the consumer does not include $I_2$ and the nonces with the refund request, and the vendor 616 does not verify the Hash subfield 514 of the scrip before issuing the refund coupon.

In this case, the refund is made without the consumer 610 revealing any additional identity information to the vendor 616. The vendor 616 issues a broker 2 refund coupon containing the vendor's customer ID. Broker 2 614 converts the refund coupon into ordinary broker 2 scrip with broker 2's customer ID. Since the vendor 616 never sees I, the nonces, or broker 2's customer ID, the vendor 616 does not learn any additional information about the consumer 610 during the refund.

Accordingly, the present invention provides relative consumer anonymity while making purchases and making unverified refunds, but allows the vendor to easily verify the consumer's identity—if necessary to prevent fraud—before issuing a refund. This verification requires no extra storage at the vendor and minimal storage in the consumer's wallet.

In addition, the present invention maintains the trust agreement between the parties. The refunded scrip from the broker uses the original customer ID of the consumer's broker scrip. The vendor does not know the MCS for that customer ID, so the vendor cannot know the CS. Since the consumer must present a refund coupon to the broker before obtaining a refund, and the refund coupon has an identifier that marks the coupon as being issued by a specific vendor, the broker knows exactly which vendor provided the refund. Moreover, the refund coupon bears a customer ID that comes from a series of customer IDs issued by the broker for that vendor. Thus, the broker can return broker scrip to the consumer, knowing that the refund is related to scrip the consumer purchased from the vendor. The consumer, in turn, already knows the CS for the customer ID in the scrip.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

We claim:

1. A system comprising:
    a first system for issuing scrip, the scrip including a value derived from an identification of a recipient of the scrip; and
    a second system for receiving the scrip issued by the first system from a party seeking a refund and issuing a refund in response thereto, the second system further adapted to receive from the party seeking the refund the identification of the recipient of the scrip and values enabling transformation by the second system of the identification of the recipient of the scrip into the value derived from the identification of the recipient of the scrip, and to utilize the received values to verify that the party seeking the refund is the recipient of the scrip.

2. The system of claim 1, wherein the recipient of the scrip is adapted to store one or more nonces utilized to create the value derived from an identification of the recipient of the scrip.

3. The system of claim 1, wherein the first system is adapted to receive the identification of the recipient of the scrip prior to issuing the scrip to the recipient.

4. The system of claim 3, wherein the first system is further adapted to hash the identification of the recipient of the scrip with a nonce and store the hash in the issued scrip as the value derived from the recipient of the scrip.

5. The system of claim 4, wherein the received identification of the recipient of the scrip is a hash of identifying information with a second nonce.

6. A method of providing a refund in an electronic commerce system, comprising the steps of:
    receiving, by a second party from a first party, electronic currency for which the first party seeks a refund, wherein the electronic currency includes a first value derived from information identifying the first party and wherein the second party is unable to identify the first party with the first value;
    receiving, by the second party from the first party, the information identifying the first party and values for transforming the information identifying the first party into the first value;
    using, by the second party, the values for transforming the information identifying the first party into the first value to transform the information identifying the first party into a second value;
    comparing, by the second party, the second value with the first value; and
    enabling, by the second party, a refund for the electronic currency if the first value matches the second value.

7. The method of claim 6, wherein the step of receiving the information identifying the first party and values for transforming the information identifying the first party into the first value comprises the steps of:
    receiving, by the second party, information uniquely identifying the first party; and
    receiving, by second party, at least one nonce with which the information uniquely identifying the first party is hashed to produce the second value.

8. The method of claim 6, wherein the information identifying the first party includes a predetermined value.

9. The method of claim 8, wherein the predetermined value is a text string.

10. The method of claim 6, further comprising the step of:
    issuing, by the second party to the first party, a refund coupon entitling the first party to a refund for the electronic currency.

11. The method of claim 10, further comprising the steps of:
    receiving, by a third party from the first party, the refund coupon and the electronic currency for which the first party seeks a refund;
    receiving, by the third party from the first party, an identification value for electronic currency previously issued by the third party; and issuing, by the third party to the first party, electronic currency having the provided identification value.

12. A computer readable medium having computer instructions encoded thereon for directing a computer system to perform steps for providing a refund in an electronic commerce system, the steps comprising:
   receiving a request to refund electronic currency, the electronic currency including a value identifying the party to whom the currency was issued;
   receiving, from the party seeking the refund, identifying information identifying the party seeking the refund and values for transforming the information identifying the party seeking the refund into the value identifying the party to whom the currency was issued;
   utilizing the received values to verify that the received identifying information matches the value in the electronic currency identifying the party to whom the electronic currency was issued; and
   responsive to a positive verification, entitling the party to whom the electronic currency was issued to a refund for the electronic currency.

13. The computer readable medium of claim 12, wherein the step of receiving values comprises:
   receiving one or more nonces with which the information identifying the party seeking the refund is hashed to produce the value identifying the party to whom the currency was issued.

14. The computer readable medium of claim 12, wherein the step of entitling the party to whom the currency was issued to a refund for the electronic currency comprises:
   issuing a refund coupon to the party seeking the refund;
   wherein the party seeking the refund can use the refund coupon to refund the electronic currency at a party who issued the electronic currency.

15. The computer readable medium of claim 12, wherein the steps for providing a refund in an electronic commerce system further comprise:
   receiving electronic currency containing a first value identifying the party to whom the currency was issued;
   hashing the first value with a nonce to form a second value identifying the party to whom the currency was issued; and
   issuing electronic currency incorporating the second value; wherein
   the received request to refund electronic currency comprises a request to refund the electronic currency incorporating the second value.

* * * * *

UNITED STATES PATENT AND TRADEMARK OFFICE
CERTIFICATE OF CORRECTION

PATENT NO. : 7,257,554 B1  Page 1 of 1
APPLICATION NO. : 09/273102
DATED : August 14, 2007
INVENTOR(S) : Steven C. Glassman et al.

It is certified that error appears in the above-identified patent and that said Letters Patent is hereby corrected as shown below:

On the title page, item [56] on page 2, under "Foreign Patent Documents", in column 2, line 5, delete "JP    10-171887    6/1998".

In column 1, line 42, delete "finds" and insert -- funds --, therefor.

In column 1, line 47, delete "finds" and insert -- funds --, therefor.

In column 1, line 57, delete "though" and insert -- through --, therefor.

In column 4, line 46, delete "1110" and insert -- 110 --, therefor.

In column 10, line 5, delete "nonce" and insert -- $nonce_1$ --, therefor.

Signed and Sealed this

Fourteenth Day of July, 2009

JOHN DOLL
*Acting Director of the United States Patent and Trademark Office*